United States Patent
Kray et al.

(10) Patent No.: US 10,539,025 B2
(45) Date of Patent: Jan. 21, 2020

(54) AIRFOIL ASSEMBLY WITH LEADING EDGE ELEMENT

(71) Applicant: General Electric Company, Schenectady, NY (US)

(72) Inventors: Nicholas Joseph Kray, Mason, OH (US); Trevor Howard Wood, Clifton Park, NY (US); Dong-Jin Shim, Niskayuna, NY (US); Pranav Dhoj Shah, Albany, NY (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 15/040,582

(22) Filed: Feb. 10, 2016

(65) Prior Publication Data

US 2017/0226865 A1 Aug. 10, 2017

(51) Int. Cl.
| | | |
|---|---|---|
| *F01D 5/14* | (2006.01) | |
| *F01D 5/28* | (2006.01) | |
| *F01D 9/04* | (2006.01) | |

(52) U.S. Cl.
CPC ............. *F01D 5/141* (2013.01); *F01D 5/147* (2013.01); *F01D 5/282* (2013.01); *F01D 5/288* (2013.01); *F01D 9/041* (2013.01); *F05D 2220/323* (2013.01); *F05D 2240/121* (2013.01); *F05D 2240/303* (2013.01); *F05D 2250/184* (2013.01); *F05D 2250/29* (2013.01); *F05D 2300/10* (2013.01); *F05D 2300/603* (2013.01); *Y02T 50/672* (2013.01); *Y02T 50/673* (2013.01)

(58) Field of Classification Search
CPC ... F01D 5/12; F01D 5/14; F01D 5/141; F01D 5/288; F01D 9/04
See application file for complete search history.

(56) References Cited

U.S. PATENT DOCUMENTS

| | | | | |
|---|---|---|---|---|
| 4,006,999 | A * | 2/1977 | Brantley | F01D 5/282 416/224 |
| 5,088,665 | A | 2/1992 | Vijgen et al. | |
| 5,533,865 | A | 7/1996 | Dassen et al. | |
| 6,431,498 | B1 | 8/2002 | Watts et al. | |
| 6,431,837 | B1 * | 8/2002 | Velicki | F01D 5/282 416/223 R |
| 6,830,436 | B2 | 12/2004 | Shibata et al. | |
| 7,744,346 | B2 * | 6/2010 | Schreiber | F01D 5/141 416/223 R |

(Continued)

FOREIGN PATENT DOCUMENTS

| | | |
|---|---|---|
| CN | 104508246 A | 4/2015 |
| GB | 2482247 A | 1/2012 |

(Continued)

OTHER PUBLICATIONS

Extended European Search Report issued in connection with corresponding EP Application No. 17154833.2 dated Jun. 20, 2017.

(Continued)

*Primary Examiner* — Justin D Seabe
(74) *Attorney, Agent, or Firm* — McGarry Bair PC

(57) ABSTRACT

An airfoil assembly including a composite body having a mounting edge and a trailing edge which is secured to a leading edge element defining a 3-D leading edge geometry with both chord and camber variation.

23 Claims, 6 Drawing Sheets

(56) References Cited

U.S. PATENT DOCUMENTS

| | | | |
|---|---|---|---|
| 8,083,487 B2* | 12/2011 | Wood | F01D 5/141 416/223 R |
| 8,535,008 B2 | 9/2013 | Dewar et al. | |
| 9,249,666 B2 | 2/2016 | Wood et al. | |
| 9,470,097 B2* | 10/2016 | Hodgson | F01D 5/14 |
| 9,664,201 B2* | 5/2017 | Dudon | B23P 15/04 |
| 2008/0159868 A1* | 7/2008 | Kray | B23P 15/04 416/223 R |
| 2008/0187442 A1 | 8/2008 | Standish et al. | |
| 2009/0013532 A1 | 1/2009 | Wood et al. | |
| 2009/0074585 A1 | 3/2009 | Koegler et al. | |
| 2012/0021243 A1 | 1/2012 | Kray et al. | |
| 2013/0156592 A1 | 6/2013 | Kray et al. | |
| 2013/0164488 A1* | 6/2013 | Wood | F04D 29/324 428/80 |
| 2015/0026980 A1* | 1/2015 | Tellier | F01D 5/005 29/889.1 |
| 2015/0377030 A1* | 12/2015 | Murdock | F01D 5/147 416/224 |
| 2016/0160659 A1* | 6/2016 | Obuchi | F01D 5/147 415/200 |

FOREIGN PATENT DOCUMENTS

| | | |
|---|---|---|
| WO | 2014/143262 A1 | 9/2014 |
| WO | 2014133546 A1 | 9/2014 |

OTHER PUBLICATIONS

Machine Translation and First Office Action and Search issued in connection with corresponding CN Application No. 201710074182.0 dated Aug. 31, 2018.

Chinese Office Action corresponding to Chinese Application No. 2019050501781680 dated May 8, 2019.

* cited by examiner

AIRFOIL ASSEMBLY WITH LEADING EDGE ELEMENT

BACKGROUND OF THE INVENTION

Turbine engines, and particularly gas or combustion turbine engines, are rotary engines that extract energy from a flow of combusted gases passing through a fan with a plurality of blades, then into the engine through a series of compressor stages, which include pairs of rotating blades and stationary vanes, through a combustor, and then through a series of turbine stages, which include pairs of rotating blade and stationary vanes. In the compressor stages, the blades are supported by posts protruding from the rotor while the vanes are mounted to stator disks.

During operation air is pressurized in the compressor and mixed with fuel in the combustor for generating hot combustion gases which flow downstream through the turbine stages. Due to extreme temperatures of the combustion gas flow path and operating parameters, the stator vanes and rotating blades in both the turbine and compressor may become highly stressed with extreme mechanical and thermal loading. The vanes and blades, along with other engine components, must be able to handle these stresses. Composite airfoils are now commonly used for the vanes and blades to handle the thermal stresses while reducing weight for increased efficiency.

Additionally, composite airfoils can be formed to receive a metal leading edge element produced to reduce the effects of upstream gusts in airflow or foreign objects that occasionally pass by the airfoils. The airfoils must be able to withstand unsteady pressure and noise from the gusts along with an impact from the objects, especially the leading edge of the vane/blade.

BRIEF DESCRIPTION OF THE INVENTION

In one aspect, embodiments of the invention relate to an airfoil assembly comprising a body having a mounting edge and a trailing edge, and a leading edge element secured to the mounting edge and defining a 3-D leading edge geometry with both chord and camber variation.

In another aspect, embodiments of the invention relate to an airfoil comprising a leading edge element having a 3-D leading edge geometry with variation in both chord and camber, a trailing edge element, and a connection securing the leading edge element to the trailing edge element.

In another aspect, embodiments of the invention relate to a method of forming an airfoil comprising securing a leading edge element having a 3-D leading edge geometry with both chord and camber variation to a trailing edge element.

DESCRIPTION OF EMBODIMENTS OF THE INVENTION

The described embodiments relate to an apparatus and method for fabricating an airfoil such as, but not limited to, for use in a rotary device. The embodiments described herein are not limiting, but rather are exemplary only. It should be understood that the disclosed embodiments may apply to any type of airfoil or aerodynamic surface, such as, but not limited to, fan blades, rotor blades, stator vanes, ducted fan blades, unducted fan blades, struts, vanes, nacelle inlets, open rotor propulsion systems, wind-turbine blades, propellers impellers, diffuser vanes, and/or return channel vanes. More specifically, the disclosed embodiments may apply to any airfoil, or aerodynamic surface.

The described embodiments of the present invention are directed to systems, methods, and other devices related to routing airflow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications. Gas turbine engines have been used for land and nautical locomotion and power generation, but are most commonly used for aeronautical applications such as for airplanes, including helicopters. In airplanes, gas turbine engines are used for propulsion of the aircraft. The invention is applicable in all of these applications.

Figure 1:
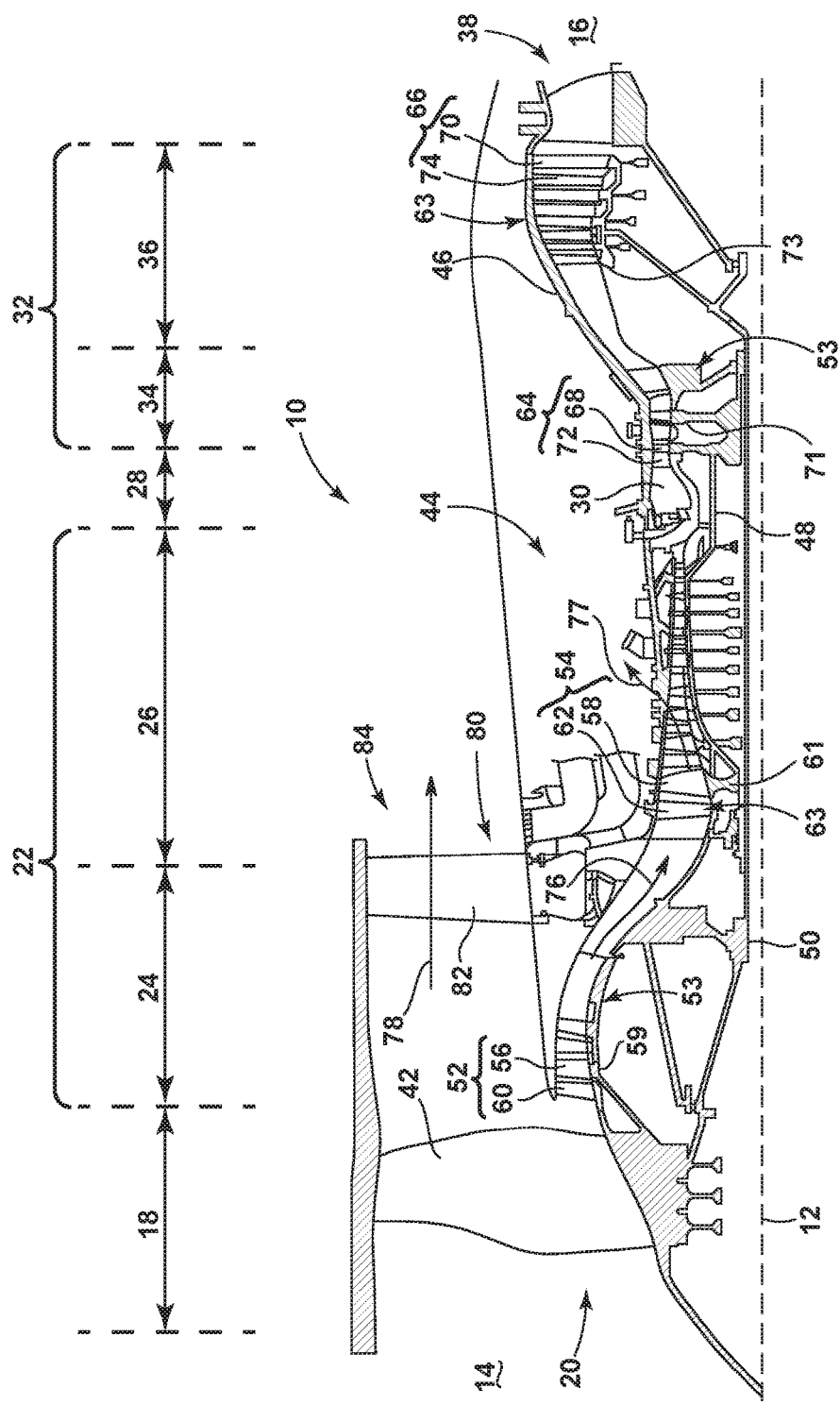
FIG. 1 is a schematic cross-sectional diagram of a gas turbine engine for an aircraft according to a first embodiment of the invention.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
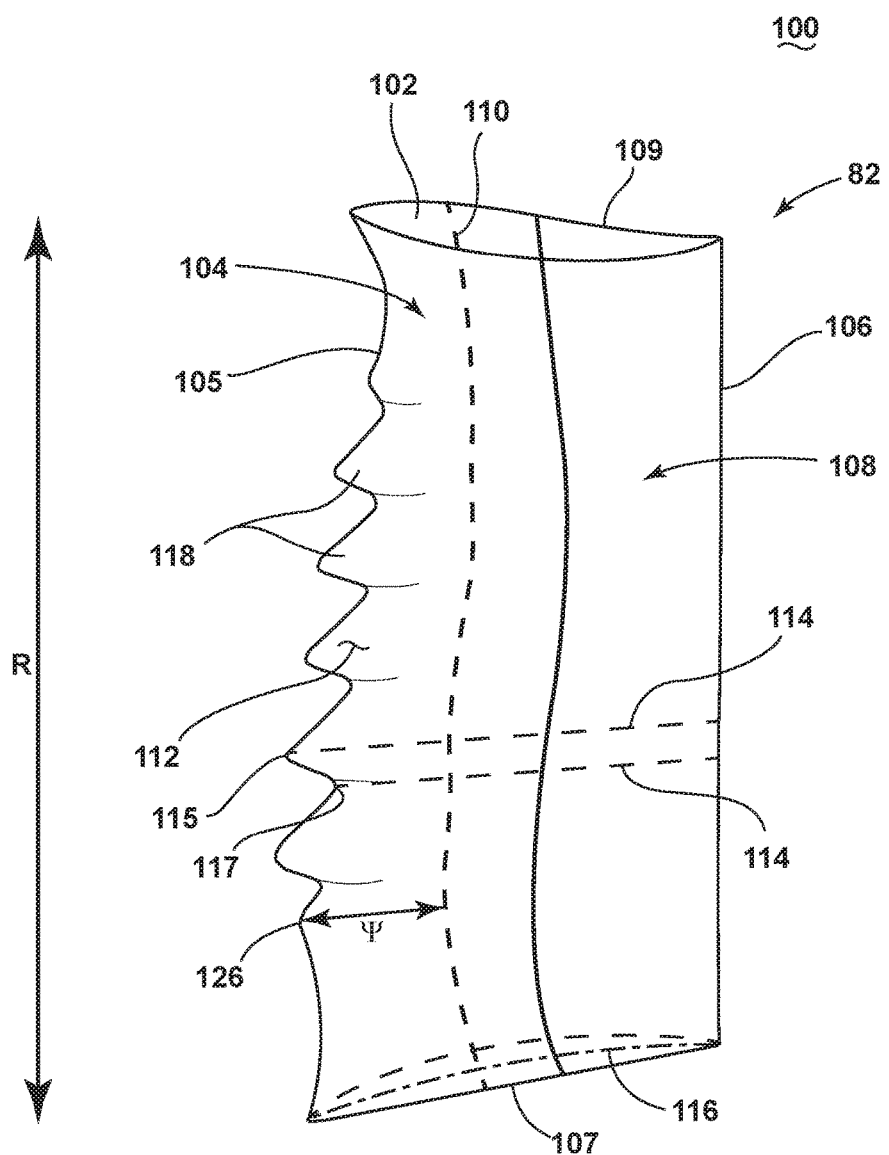
FIG. 2 is a perspective view of a vane segment.

FIG. 2 is a perspective view of an airfoil assembly 100, simply referred to from now on as a blade assembly, which can be described as an airfoil 102 having a physically separate leading edge element 104, including a leading edge 105, and trailing edge element 108, having a trailing edge 106. The airfoil includes a pressure side 107 and a suction side 109, where the suction side 109 has a length that is greater than the pressure side 107. The airfoil 102 is further characterized by a chord 114 defined as a length of a straight line from the leading edge 105 to the trailing edge and a camber 116 defined as a length of a line connecting a collection of points midway between the suction side 109 and pressure side 107 of the airfoil 102.

In an exemplary embodiment the airfoil 102 is the airfoil guide vane 82 of the outlet guide assembly 80 that may be used in an engine assembly, generally similar to the engine assembly 10 of FIG. 1. Alternatively, the blade assembly 100 may be used with, but not limited to, rotor blades, and/or stator vanes/blades, including a blade assembly for a helicopter.

While not necessary, it is contemplated that the leading edge element 104 and the trailing edge element 108 are made of different materials, with the different materials being selected for the different utility of the leading and trailing edge elements 104, 108. The trailing edge element 108 can be formed from a composite into a body 111 having a mounting edge 110 that tapers into the trailing edge 106. The leading edge element 104 can be made of a metal element machined or case into a 3-D leading edge geometry 112 having both chord 114 and camber 116 variation comprising a plurality of undulations 118 and secured to the mounting edge 110. The undulations 118 can be symmetrical or asymmetrical, they can extend partially or fully along the span of the airfoil, and they can have any suitable shape, including a wave shape when viewed in planform. Specific examples of the undulations can be found in U.S. application Ser. No. 13/334,609, now U.S. Pat. No. 9,249,666, which is incorporated by reference.

The undulations 118 cause the length of the chord 114 to vary. This variation is dependent on a length $\psi$ having a distance defined as the length of a line running from a tip 126 to the end 128 of the mounting edge 110. The tip 126 can be anywhere along the leading edge 105. To illustrate the variations the chord 114 is depicted as two differing lengths, one from the trailing edge 106 to a maximum 115 of the undulation 118, and one from the trailing edge 106 to a minimum 117 of the undulation 118. While the length of the chord 114 changes due to these variations, the length $\psi$ is a variation only within the 3-D leading edge geometry 112 of the leading edge element 104.

Figure 3:
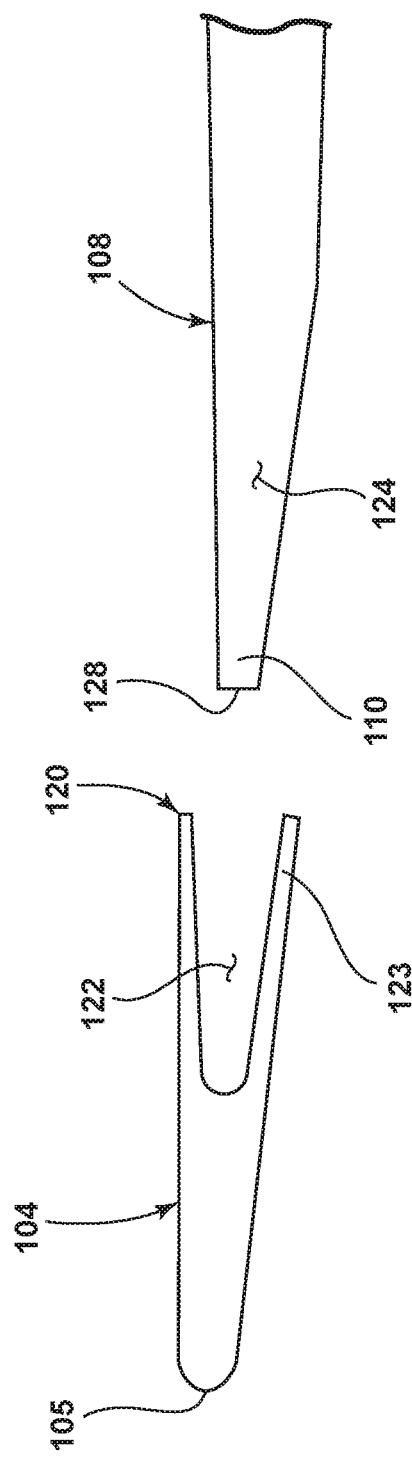
FIG. 3 is an exploded cross-sectional view of the vane segment of FIG. 2.

As illustrated in FIG. 3, the blade assembly 100 includes the leading edge element 104 and the composite body 111 which are brought together by a connection 120 which secures the mounting edge 110 and the leading edge element 104 by bonding a projection 124 within a recess 122 by known means in the art with for example, but not limited to, an adhesive bond. In an exemplary embodiment, the connection 120 includes the recess 122 formed along an aft edge 123 in the leading edge element 104 to receive the projection 124 which extends from the mounting edge 110. The recess can also be in the mounting edge element and the projection in the leading edge element.

Figure 4:
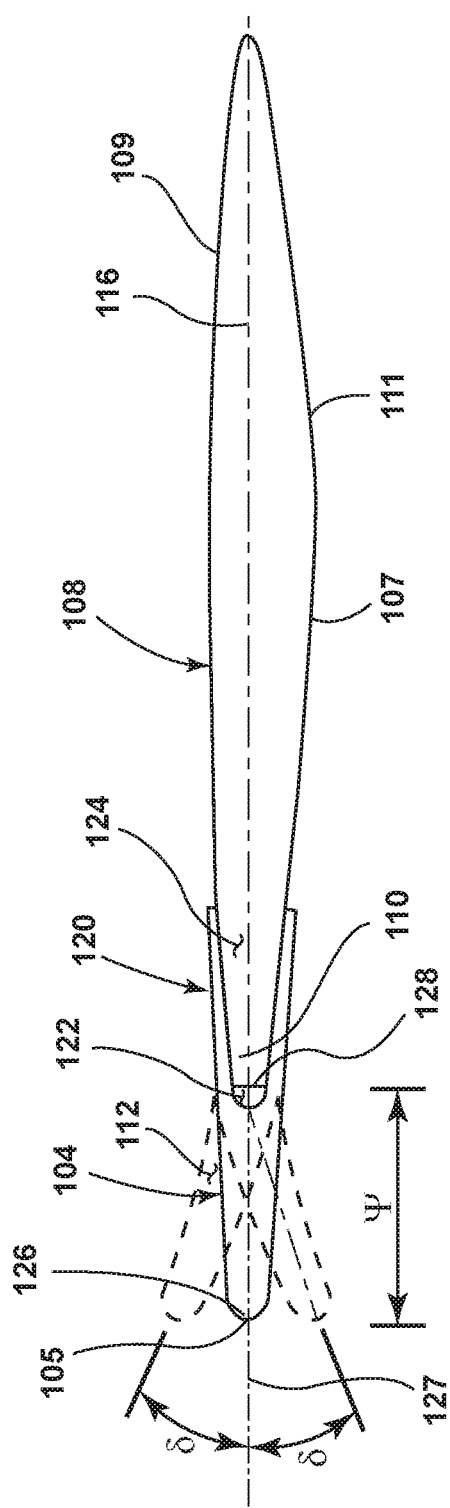
FIG. 4 is a cross-sectional view of the vane segment of FIG. 2.

Turning to FIG. 4, the airfoil 102 is shown assembled including the 3-D geometry 112 of the leading edge element 104 illustrated in different variations. While the chord 114 variations are characterized by the length ψ, the camber 116 variations are characterized by an angle δ sweeping from a neutral axis 127 in either circumferential direction. Each variation δ, ψ is a function of a radial span R and define the 3-D leading edge geometry. The specific ranges for δ, ψ and R can vary and are dictated by the particular implementation and are not germane to the invention. However, details of the exemplary geometry can be found in the previously mentioned U.S. application Ser. No. 13/334,609, now U.S. Pat. No. 9,249,666, which was incorporated by reference.

A method for forming the airfoil 102 includes securing the leading edge element 104 having the 3-D leading edge geometry 112 with the chord 114 and camber 116 variation to the trailing edge element 108. Securing the leading and trailing edge elements 104, 108 comprises doing so mechanically and/or bonding together the leading edge element 104 to the trailing edge element 108.

Figure 5:
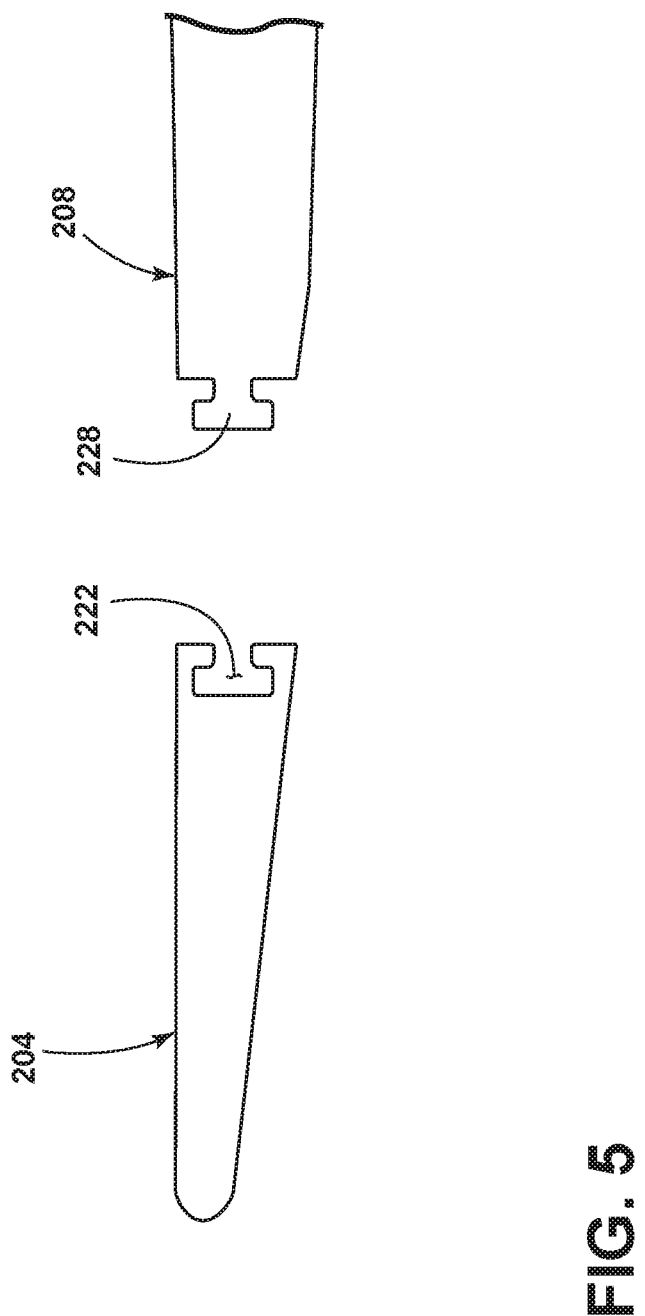
FIG. 5 is an exploded cross-sectional view of a second embodiment of the vane segment of FIG. 2.
Figure 6:
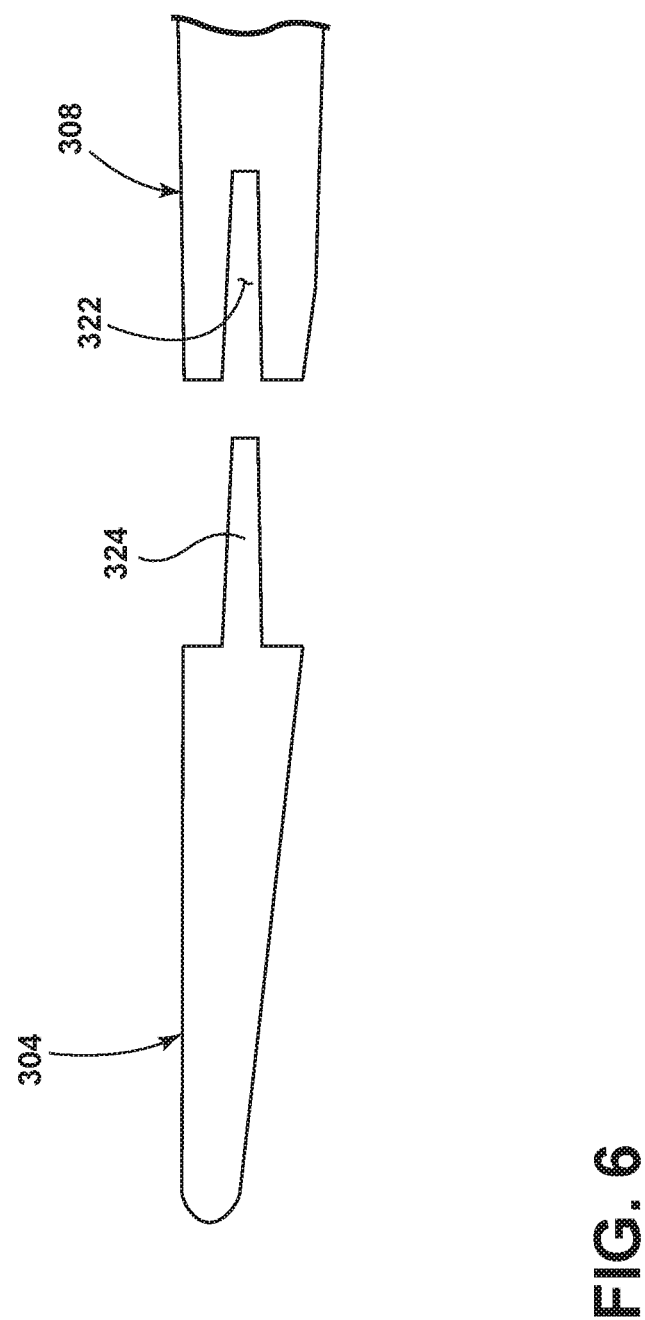
FIG. 6 is an exploded cross-sectional view of a third embodiment of the vane segment of FIG. 2.

Other exemplary embodiments of securing the leading edge element to the trailing edge element are illustrated in FIGS. 5 and 6. In FIG. 5 a T-shaped end 228 is formed on the trailing edge element 208 to connect with a T-shaped recess 222 on the leading edge element 204. In FIG. 6 a channel 322 in the trailing edge element 308 with a projection 324 is formed to fit into the channel 322 as part of the leading edge element 304.

Bonding the metal leading edge element 104 to the composite trailing edge element 108 enables the entire contact surface to participate in load management. This increases the efficiency of the load allowing for the thickness and weight of both the metal and composite materials to be reduced.

The metal forming the leading edge element 104 is easily shaped to make the 3-D leading edge geometry 112, and while it is not necessary that the leading edge element 104 be removable after installation, it is beneficial for it to be so, as it provides for replacement of just the leading edge element 104, not the entire blade assembly 100, when there is impact damage on the leading edge 105.

Removing the leading edge element 104 in a scenario where damage has occurred to the leading edge 105 is possible without damaging the trailing edge element 108 or the composite body 111. The leading edge element 104 is designed to be taken off and replaced without damaging any surrounding parts.

This disclosed design allows for application of 3-D geometric features to composite airfoils without having to modify ply orientations. All 3-D features are implemented as a function of the bonded leading edge element 104. These 3-D features are effective in reducing noise and increasing performance. These 3-D features include both camber and chord variation as a function of radial span. By putting the 3-D features onto a metal leading edge 104 it removes issues associated with composite manufacturing with 3-D features which can cause ply wrinkling and reduce overall composite strength.

It should be appreciated that application of the disclosed design is not limited to turbine engines with fan and booster sections, but is applicable to turbojets and turboprop engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil assembly comprising:
an airfoil extending axially between a leading edge and a trailing edge to define a chord-wise direction, the airfoil comprising:
a body having a mounting edge spaced from the leading edge in the chord-wise direction along a camber line and extending from the mounting edge to the trailing edge to define at least a portion of the airfoil; and
a leading edge element extending from the leading edge toward the mounting edge in the chord-wise direction to define a length of at least a portion of the airfoil, secured to the body at the mounting edge, and defining a 3-D leading edge geometry comprising a plurality of undulations along the leading edge having both chord and camber variation; wherein the length varies between a maximum and a minimum to define the undulations.

2. The airfoil assembly of claim 1 wherein the body comprises a composite body.

3. The airfoil assembly of claim 2 wherein the leading edge element comprises a metal element machined into the 3-D leading edge geometry.

4. The airfoil assembly of claim 1 wherein the undulations are asymmetrical in planform.

5. The airfoil assembly of claim 1 wherein the undulations define a plurality of wave shaped projections in planform.

6. The airfoil assembly of claim 1 further comprises a connection securing the mounting edge and the leading edge element.

7. The airfoil assembly of claim 6 wherein the connection comprises a recess within one of the mounting edge or the leading edge element and a projection extending from the other of the mounting edge and the leading edge element, with the projection received within the recess.

8. The airfoil assembly of claim 7 further comprising bonding the projection within the recess.

9. The airfoil assembly of claim 8 wherein the projection extends from the body and the recess is formed within the leading edge element.

10. The airfoil assembly of claim 9 wherein the recess is formed along an aft edge of the leading edge element.

11. The airfoil assembly of claim 1 wherein blade assembly is a blade assembly for an outlet guide vane.

12. An airfoil having a pressure side and a suction side and extending axially between a leading edge and a trailing edge to define a chord-wise direction, the airfoil comprising:
a leading edge element defining the leading edge having a 3-D leading edge geometry comprising a plurality of undulations having a length that varies between a maximum and a minimum, and with variation in both chord and camber located along the leading edge;
a trailing edge element defining the trailing edge; and
a connection interior of both the pressure side and the suction side securing the leading edge element to the trailing edge element;

wherein the connection comprises a recess spaced from the leading edge in the chord-wise direction within one of the trailing edge element or the leading edge element and a projection extending from the other of the trailing edge element and the leading edge element, with the projection received within the recess.

13. The airfoil of claim 12 wherein the leading edge element and trailing edge element are made from different materials.

14. The airfoil of claim 13 wherein the leading edge element is metal.

15. The airfoil of claim 14 wherein the trailing edge element is composite.

16. The airfoil of claim 12 wherein the undulations are asymmetrical in planform.

17. The airfoil of claim 12 wherein the undulations define a wave shape in planform.

18. The airfoil of claim 12 further comprising bonding the projection within the recess.

19. The airfoil of claim 18 wherein the projection extends from the trailing edge element and the recess is formed within the leading edge element.

20. The airfoil of claim 19 wherein the recess is formed along an aft edge of the leading edge element.

21. A method of forming an airfoil having a pressure side and a suction side and extending axially between a leading edge and a trailing edge to define a chord-wise direction, the method comprising securing a trailing edge element extending in the chord-wise direction from a mounting edge to the trailing edge to a leading edge element having a 3-D leading edge geometry comprising a plurality of undulations with both chord and camber variation and located along the leading edge; wherein the securing occurs at the mounting edge and in a location spaced from the leading edge to define a length in the chord-wise direction interior of both the pressure side and the suction side; wherein the length varies between a maximum and a minimum to define the undulations.

22. The method of claim 21 wherein the securing comprises mechanically securing together the leading edge and trailing edge elements.

23. The method of claim 22 wherein the securing comprises bonding together the leading edge and trailing edge elements.

* * * * *